United States Patent [19]

Hashimoto

[11] Patent Number: 5,941,209
[45] Date of Patent: Aug. 24, 1999

[54] FUEL INJECTION APPARATUS AND METHOD FOR DIRECT INJECTION TYPE ENGINES

[75] Inventor: Hiromasa Hashimoto, Toyota, Japan

[73] Assignee: Toyota Jidosha Kabushiki Kaisha, Toyota, Japan

[21] Appl. No.: 08/992,480

[22] Filed: Dec. 17, 1997

[30] Foreign Application Priority Data

Dec. 19, 1996 [JP] Japan .................................. 8-339790

[51] Int. Cl.$^6$ .................................................. F02B 17/00
[52] U.S. Cl. .......................................................... 123/295
[58] Field of Search .................................. 123/295, 305, 123/486, 478, 501; 701/105, 179.16

[56] References Cited

U.S. PATENT DOCUMENTS

| | | | |
|---|---|---|---|
| 4,372,278 | 2/1983 | Smith | 123/478 |
| 4,480,620 | 11/1984 | Tange et al. | 123/295 |
| 5,222,481 | 6/1993 | Morikawa | 123/435 |
| 5,331,933 | 7/1994 | Matsushita | 123/435 |
| 5,718,203 | 2/1998 | Shimada et al. | 123/305 |
| 5,797,367 | 8/1998 | Iida et al. | 123/295 |

FOREIGN PATENT DOCUMENTS

| | | |
|---|---|---|
| A-63-246442 | 10/1988 | Japan . |
| U-3-56841 | 5/1991 | Japan . |
| Y-4-55233 | 12/1992 | Japan . |
| A-8-312401 | 11/1996 | Japan . |

*Primary Examiner*—Erick R. Solis
*Attorney, Agent, or Firm*—Oliff & Berridge, PLC

[57] ABSTRACT

An improved controller for controlling fuel injection in an internal combustion engine. The engine includes a fuel injection valve for directly injecting fuel into a combustion chamber. A fuel pressure sensor detects the fuel pressure within the injection valve. An ECU computes opening time of the injection valve and closing time of the injection valve based on a required fuel injection amount. The ECU computes a reference time at which the pressure in the combustion chamber reaches the injection pressure of the injection valve based on the detected fuel pressure. If necessary, the ECU advances the computed opening time and the computed closing time. As a result, the fuel injection from the injection valve is finished before the reference time. This prevents matter inside the combustion chamber from entering the fuel injection valve, and it guarantees that fuel will be able to exit the fuel injection valve during injection.

20 Claims, 5 Drawing Sheets

FUEL INJECTION APPARATUS AND METHOD FOR DIRECT INJECTION TYPE ENGINES

BACKGROUND OF THE INVENTION

The present invention relates to fuel injection apparatuses having fuel injectors that inject fuel directly into engine cylinders and methods for controlling fuel injection.

In a typical automotive engine, fuel is injected into an intake passage and mixed homogeneously with air that passes through the intake passage. The homogeneous air fuel mixture is then sent to combustion chambers that are defined in the engine. In each combustion chamber, the air fuel mixture is ignited by a spark plug. This burns the mixture and produces drive force.

The combustion of the air fuel mixture in such homogeneous state is normally referred to as homogeneous charge combustion. In an engine that performs homogeneous charge combustion, a throttle valve is located in the intake passage to adjust the amount of air fuel mixture drawn into the combustion chambers and thus control the engine torque.

However, in engines that perform homogeneous combustion, the throttling action of the throttle valve decreases the pressure in the intake passage. This increases energy losses due to pumping (pumping losses) when the air fuel mixture is drawn into the combustion chambers from the intake passage and thus decreases the efficiency of the engine.

Stratified charge combustion solves this problem. In stratified charge combustion, fuel is injected directly into each combustion chamber. This delivers a rich, highly combustible air fuel mixture to the vicinity of the spark plug. Ignition of the rich air fuel mixture burns the surrounding lean air fuel mixture. In an engine that performs stratified charge combustion, the engine torque is basically controlled by adjusting the amount of fuel injected toward the vicinity of the spark plug. Accordingly, the throttling by the throttle valve is unnecessary. This decreases pumping losses and improves the efficiency of the engine. Furthermore, in an engine that performs stratified charge combustion, the overall air fuel mixture is usually lean. This improves fuel efficiency.

Japanese Unexamined Patent Publication No. 63-246442 describes an engine that performs stratified charge combustion and homogeneous combustion in accordance with the state of the engine. In this engine, a first fuel injector is provided for each cylinder to inject fuel directly into the cylinder. A second fuel injector injects fuel into the intake passage. Fuel is delivered to each injector from a fuel pump.

During the injection of fuel into each cylinder from the associated first fuel injector, normal fuel injection is hindered if the fuel injection pressure of the injector becomes lower than the pressure in the cylinder. This may also cause the compressed, high pressure air in the cylinder to flow into the injector. Foreign matter such as carbon is included in the air. Thus, the entrance of this air, which includes the foreign matter, into the injector may shorten the life of the valve.

Furthermore, the fuel pump uses the torque of the engine as a drive force. Thus, the fuel injection pressure is low when the engine is started. Therefore, there is a greater tendency for air to enter the injector during the starting of the engine.

The engine of the above publication deals with this problem by stopping the injection of fuel from each first injector while permitting the injection of fuel from only the second injector if the pressure in the cylinders becomes higher than the pressure in the associated first injector. As another option, fuel may be injected from both first and second injectors. This shortens the time length during which fuel is injected from first injectors. Accordingly, air is prevented from entering the fuel injector.

However, the structure described in the publication is directed toward fuel injectors that inject fuel into the intake passage. The structure of the publication may not be applied to an engine that is provided only with fuel injectors that inject fuel directly into the associated cylinder.

SUMMARY OF THE INVENTION

Accordingly, it is an objective of the present invention to provide a method of fuel injection control and a fuel injection controller that prevent the air in engine cylinders from entering the associated fuel injectors.

To achieve the above objective, in a first aspect of the present invention, a controller for controlling a fuel injection valve that communicates with a combustion chamber in an internal combustion engine is provided. The fuel injection valve contains pressurized fuel that is injected into the combustion chamber. The controller comprises a pressure detector for detecting the injection pressure within the injection valve. The controller computes a reference time at which the pressure in the combustion chamber will be greater than the pressure of the fuel in the injection valve based on the detected injection pressure and controls the fuel injection valve to complete fuel injection before the reference time.

In a second aspect of the present invention, a method for controlling a fuel injection valve that communicates with a combustion chamber in an internal combustion engine is provided. The fuel injection valve contains pressurized fuel that is injected into the combustion chamber. The method includes the steps of detecting the injection pressure within the injection valve, computing a reference time at which the pressure in the combustion chamber will be greater than the pressure of the fuel in the injection valve based on the detected injection pressure, and controlling the fuel injection valve to complete fuel injection before the reference time.

Other aspects and advantages of the invention will become apparent from the following description, taken in conjunction with the accompanying drawings, illustrating by way of example the principles of the invention.

DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

An engine fuel injection controller according to the present invention will now be described with reference to the drawings.

Figure 1:
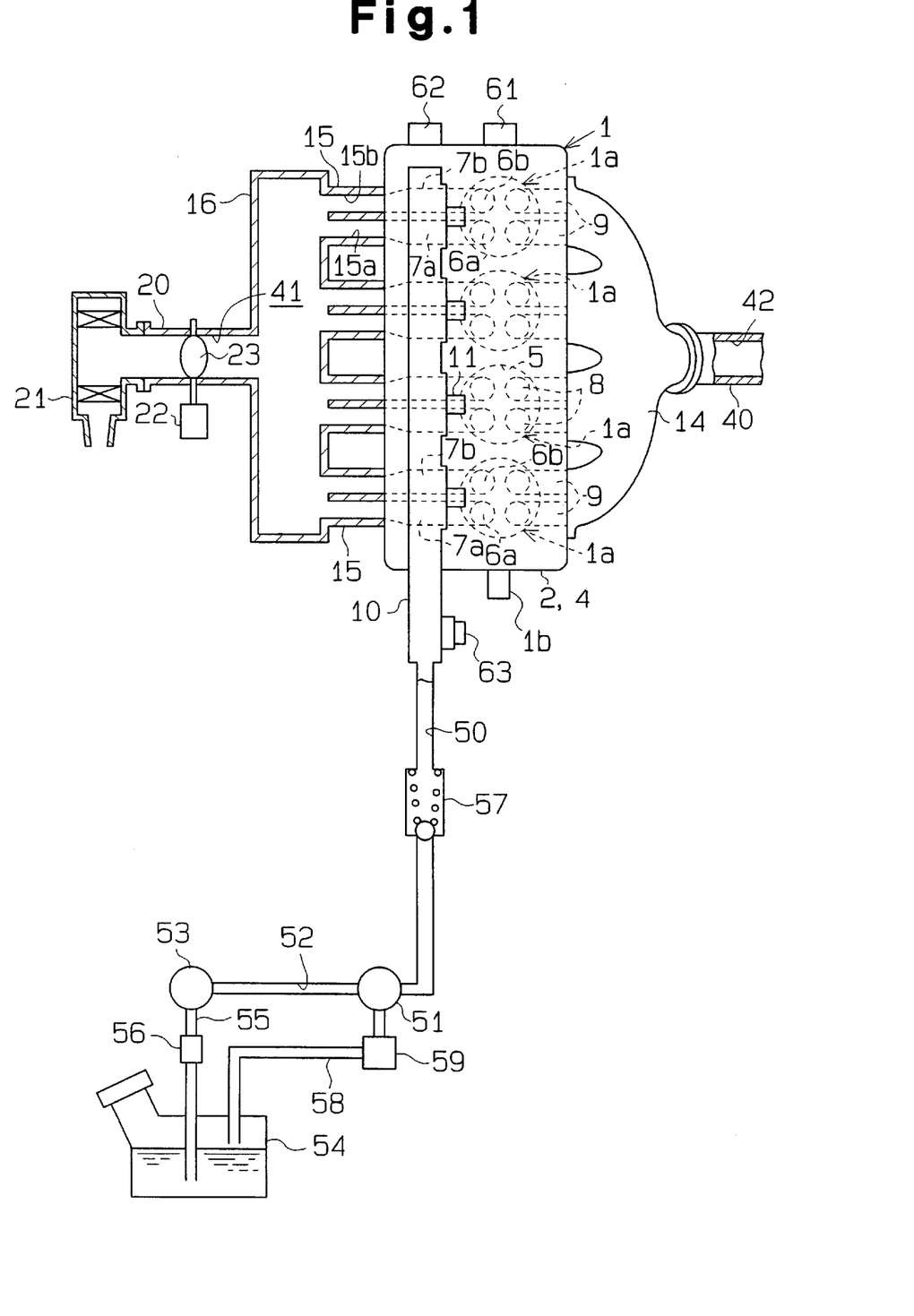
FIG. 1 is a schematic view showing a fuel injection controller according to the present invention.

FIG. 1 is a schematic view showing a fuel injection controller of a gasoline engine for automobiles. An engine 1 has four cylinders 1a. The engine 1 has a cylinder block 2 that houses the cylinders 1a. Each cylinder 1a accommodates a piston (not shown). A cylinder head 4 is arranged on top of the cylinder block 2. A combustion chamber 5 is defined in the space formed between the wall of each cylinder 1a, the associated piston, and the cylinder head 4.

Each combustion chamber 5 is connected to a first intake port 7a and a second intake port 7b. The first intake port 7a is connected to a first intake valve 6a, while the second intake port 7b is connected to a second intake valve 6b. The first and second intake valves 6a, 6b are arranged in the cylinder head 4.

A fuel distribution pipe 10 extends through the cylinder head 4. An injector 11 is provided for each cylinder 1a and connected to the distribution pipe 10. The injectors inject fuel directly into the associated cylinder 1a when performing stratified charge combustion and when performing homogeneous charge combustion. A nozzle (not shown) is provided at the distal end of each injector 11. Fuel mist is injected through the nozzle. A needle valve (not shown) is arranged in the injector 11 to open and close the nozzle.

Stratified charge combustion is performed by injecting fuel into the combustion chamber 5 when the associated piston is in the final stage of its compression stroke. The fuel is concentrated around a spark plug and then ignited. Homogeneous charge combustion is performed by injecting fuel into the combustion chamber 5 when the associated piston is in the intake stroke. The injected fuel is mixed homogeneously with air, which is drawn into the combustion chamber 5 through the associated intake ports 7a, 7b, and then burned.

The first intake port 7a of each cylinder 1a is connected with a first intake passage 15a while the second intake port 7b is connected to a second intake passage 15b. The first and second intake passages 15a, 15b extend through an intake manifold 15 and connect the associated cylinder 1a to a surge tank 16.

The surge tank 16 is connected to an air cleaner 21 through an intake duct 20. An electronically controlled throttle valve 23, which is opened and closed by a step motor 22, is arranged in the intake duct 20. An electronic control unit (ECU) 30 sends pulse signals to drive the step motor 22 and control the opening degree of the throttle valve 23 (throttle opening degree). The intake duct 20, the surge tank 16, and the first and second intake passages 15b. constitute an intake passage 41.

The distribution pipe 10 is connected to a high pressure pump 51 by a high pressure fuel passage 50. A check valve 57 is provided in the fuel passage 50 to prevent a reversed flow of fuel toward the pump 51. The high pressure pump 51 is connected to a low pressure pump 53 by a low pressure fuel passage 52. The low pressure pump 53 is connected to a fuel tank 54 by a fuel supply passage 55. A fuel filter 56 is arranged in the fuel supply passage 55 to filter the fuel. The low pressure pump 53 draws in fuel from the fuel tank 54 and forces the fuel toward the high pressure pump 51 through the low pressure fuel passage 52.

The engine 1 has a crankshaft 1b. The crankshaft 1b drives the high pressure pump 51. This pressurizes the fuel to a high pressure and forces the pressurized fuel through the high pressure fuel passage 50 and to the distribution pipe 10. The high pressure pump 51 is also connected to the fuel tank by a fuel spill passage 58. An electromagnetic spill valve 59 is arranged in the spill passage 58. When the spill valve 59 is opened, the fuel received by the high pressure pump 51 is not further pressurized and sent to the distribution pipe 10 but is returned to the fuel tank 54 through the fuel spill passage 58. When the spill valve 59 is closed, the spill passage 58 is closed. Thus, the fuel received by the high pressure pump 51 is further pressurized and sent to the distribution pipe 10 through the high pressure fuel passage 50. The ECU 30 alters the opening and closing timing of the spill valve 59 to adjust the amount and pressure of the fuel that enters the distribution pipe 10.

Each cylinder 1a includes a pair of exhaust ports 9, which are connected with an exhaust manifold 14. Each exhaust port 9 is opened and closed by an exhaust valve 8, which is arranged in the cylinder head 4. After combustion, exhaust gas is discharged from each cylinder 1a when the associated exhaust valves 8 are opened. This permits the discharge of exhaust gas through the associated exhaust port 9, the exhaust manifold 14, and the exhaust duct 40. The exhaust manifold 14 and the exhaust duct 40 constitute an exhaust passage 42.

Figure 2:
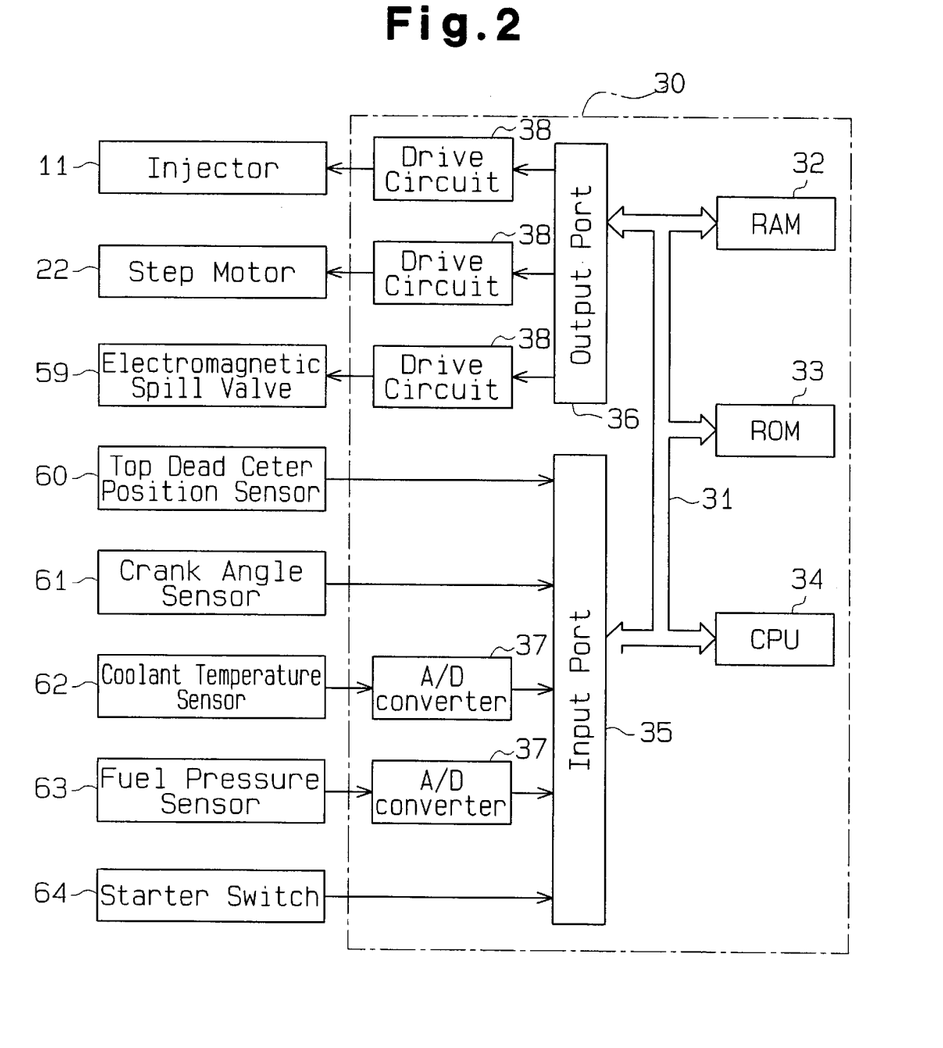
FIG. 2 is an electric block diagram showing the structure of an electronic control unit.

The structure of the ECU 30 is shown in FIG. 2. The ECU 30 has a random access memory (RAM) 32, a read only memory (ROM) 33, a central processing unit (CPU) 34, an input part 35, and an output port 36 that are connected to one another by a bidirectional bus 31.

A coolant temperature sensor 62 is provided in the cylinder block 2 to detect the temperature of the engine coolant (coolant temperature THW). A fuel pressure sensor 63 is located in the distribution pipe 10 to detect the fuel pressure in the pipe 10 (fuel pressure PF). The signal outputs of the sensors 62, 63 are input to the input port 35 by way of A/D converters 37.

A top dead center position sensor 60 and a crank angle sensor 61 are provided in the engine 1. The top dead center position sensor 60 generates an output pulse when, for example, the piston in the first cylinder 1a reaches the top dead center position during the intake stroke. The output pulse is input to the input port 35. The crank angle sensor 61 generates an output pulse, which is input to the input port 35, each time the crankshaft 1b of the engine 1 is rotated by a crank angle CA of 30 degrees. The CPU 34 reads the output pulses sent from the top dead center position sensor 60 and the crank angle sensor 61 to compute the crank angle θ and the engine speed NE.

The engine 1 includes a starter (not shown) to crank the engine 1. The starter includes a starter switch 64 (FIG. 2) to detect the actuation of the starter. The starter is actuated by an ignition switch (not shown). When the starter is actuated by the ignition switch, the starter switch 64 sends a starter signal STA to the input port 35.

The injectors 11, the step motor 22, and the electromagnetic spill valve 59 are connected to the output port 36 by associated drive circuits 38. In accordance with the signals sent from the sensors 60–64 and other sensors that are not shown, the ECU 30 optimally controls the injectors 11, the step motor 22, the electromagnetic spill valve 59, and other parts by executing control programs stored in the ROM 33.

Figure 3A:
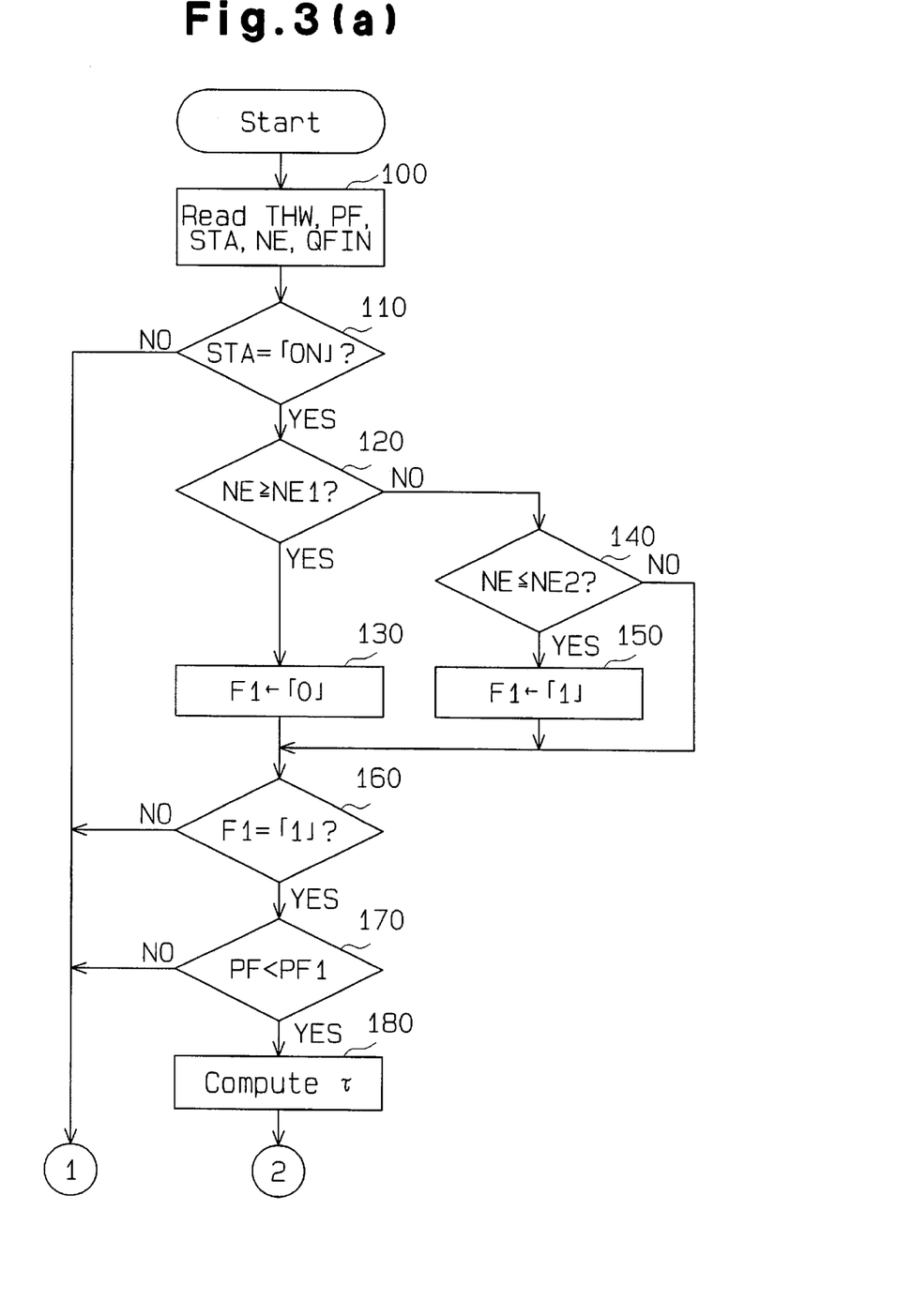
FIG. 3(a) is a flowchart showing a routine for controlling fuel injection.
Figure 3B:
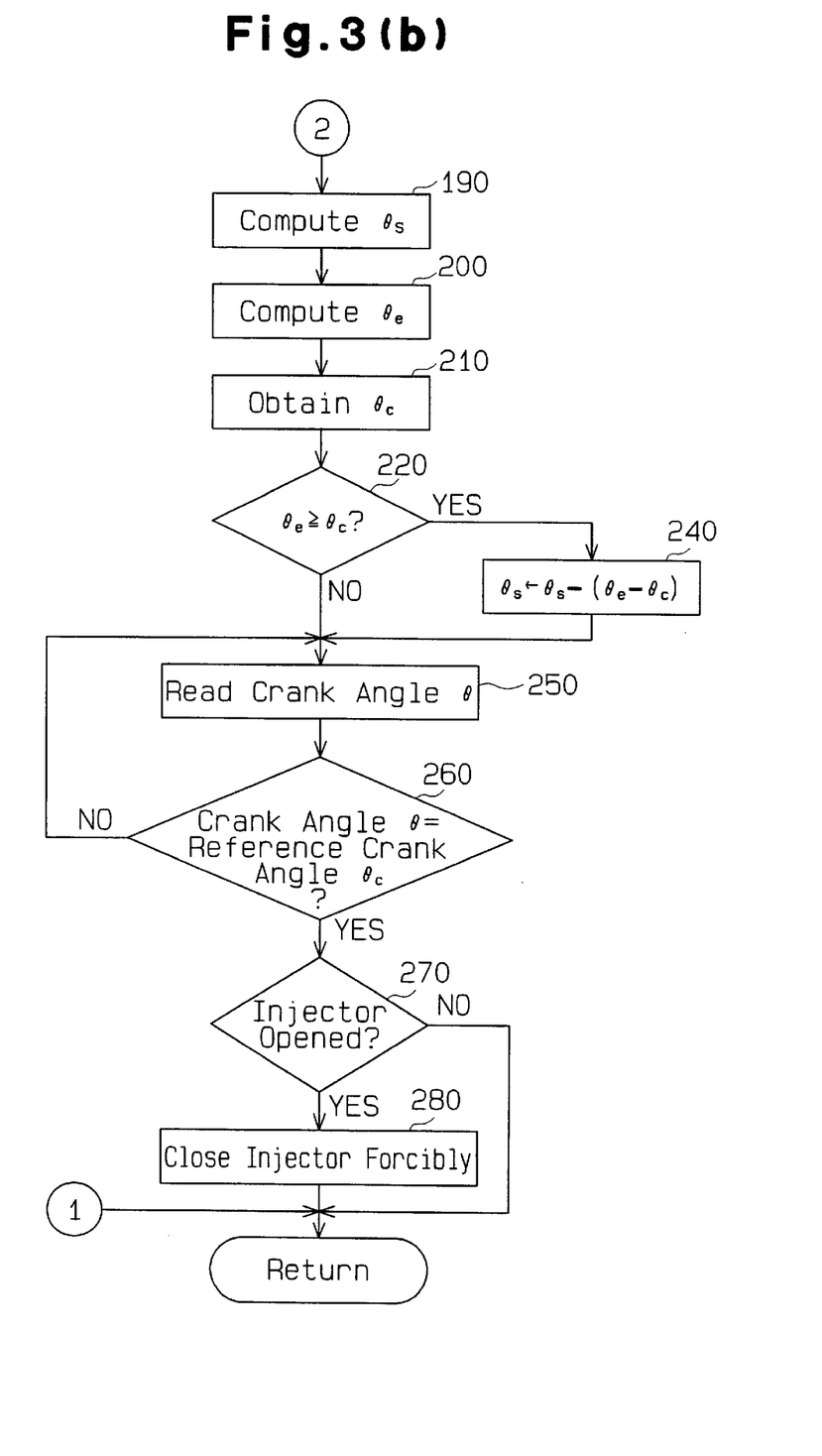
FIG. 3(b) is a continuation of the flowchart of FIG. 3(a) showing the routine for controlling fuel injection.

The control carried out by the fuel injection controller incorporated in the engine 1 will now be described in detail. FIGS. 3(a) and 3(b) show a flowchart of a routine for controlling the fuel injection timing. This routine is executed cyclically every predetermined time interval.

As shown in FIG. 3(a), when entering this routine, at step 100, the ECU 30 roads the coolant temperature THW, the fuel pressure PF, the starter signal STA, and the engine speed NE that are sent from the sensors 60–64. The ECU 30 also reads the fuel injection amount QFIN, which is stored in the RAM 32. The fuel injection amount QFIN is computed in another routine in accordance with the depression degree of the acceleration pedal and the engine speed NE and then stored in the RAM 32.

At step 110, the ECU 30 judges whether or not the starter signal STA indicates ON. If it is determined that the starter signal STA does not indicate ON, the engine 1 is not being cranked. In this case, since the engine 1 is not being started, the ECU 30 temporarily terminates subsequent processing until the next execution of the routine, or cycle.

In step 110, if it is determined that the starter signal STA indicates ON, the ECU 30 proceeds to step 120.

At step 120, the ECU 30 judges whether or not the engine speed NE is equal to or higher than a first reference value NE1. The first reference value NE1 is set at 400 rpm and used to determine whether or not the engine 1 is being started. If it is determined that the engine speed NE is equal to or higher than the first reference value NE1, the engine 1 is not being started. In this case, the ECU 30 proceeds to step 130 and sets a starting flag F1 at zero. The starting flag F1 indicates whether the engine 1 is currently being started.

If it is determined that the engine speed NE is not equal to or greater than the first reference value NE1, in step 120, the ECU 30 proceeds to step 140.

At step 140, the ECU 30 determines whether the engine speed NE is equal to or lower than a second reference value NE2. The second reference value NE2 is set at 200 rpm and used to determine whether or not the engine 1 is being started. If it is determined that the engine speed NE is equal to or lower than the second reference value NE2, the engine 1 is being started. In this case, the ECU 30 proceeds to step 150 and sets the starting flag F1 at one.

If it is determined that the engine speed NE is not equal to or lower than the second reference value NE2 in step 140, the ECU 30 proceeds to step 160. The ECU 30 also proceeds to step 160 from steps 130 and 150.

At step 160, the ECU 30 judges whether or not the starting flag F1 indicates one. If it is determined that the starting flag F1 indicates one, the engine 30 is being started. In this case, the engine 30 proceeds to step 170.

At step 170, the ECU 30 judges whether the fuel pressure PF is lower than a reference pressure value PF1. The reference pressure value PF1 is a pressure value that is greater than the maximum pressure value in the combustion chambers 5 during the compression stroke. The reference pressure value PF1 is used to determine whether fuel may be injected into the combustion chamber 5 from the associated injector 11 during the compression stroke. Fuel can be directly injected into each combustion chamber 5 from the associated injector 11 when the fuel pressure PF is equal to or greater than the reference pressure value PF1.

In step 170, if it is determined that the fuel pressure PF is not smaller than the reference pressure value PF1, the engine 1 is being started but the fuel pressure PF is high enough to permit the injection of fuel from the injectors 11 during the associated compression stroke. In this case, the ECU 30 temporarily terminates subsequent processing. The ECU 30 also temporarily terminates subsequent processing if it is determined that the starting flag F1 is not set at one in step 160.

In step 170, if it is determined that the fuel pressure PF is smaller than the reference pressure value PF1, the engine 1 is being started and the injection of fuel during the compression stroke is not possible. In this case, the ECU 30 proceeds to step 180.

At step 180, the ECU 30 computes the fuel injection time τ in accordance with the fuel injection amount QFIN. In other words, the ECU 30 computes the time period during which each injector 11 is opened.

At step 190, which is illustrated in FIG. 3, the ECU 30 computes crank angle (injection commencement angle) $\theta_S$ that corresponds to the angle at which each injector 11 is opened, or the injector open timing.

At step 200, the ECU 30 computes crank angle (injection termination angle) $\theta_e$ at which each injector 11 is closed, or the injector close timing. Under the presumption that the engine speed NE is constant, the fuel injection time τ is computed by subtracting the injection commencement angle $\theta_S$ from the injection termination angle $\theta_e$ and converting the resulting difference $(\theta_e - \theta_S)$ to time.

At step 210, the ECU 30 obtains a reference crank angle $\theta_c$ in accordance with the fuel pressure PF. The reference crank angle $\theta_c$ is used to determine whether or not fuel injection from each injector 11 will be hindered during the time period between the injection termination angle $\theta_e$ and the injection commencement angle $\theta_S$.

Figure 4:
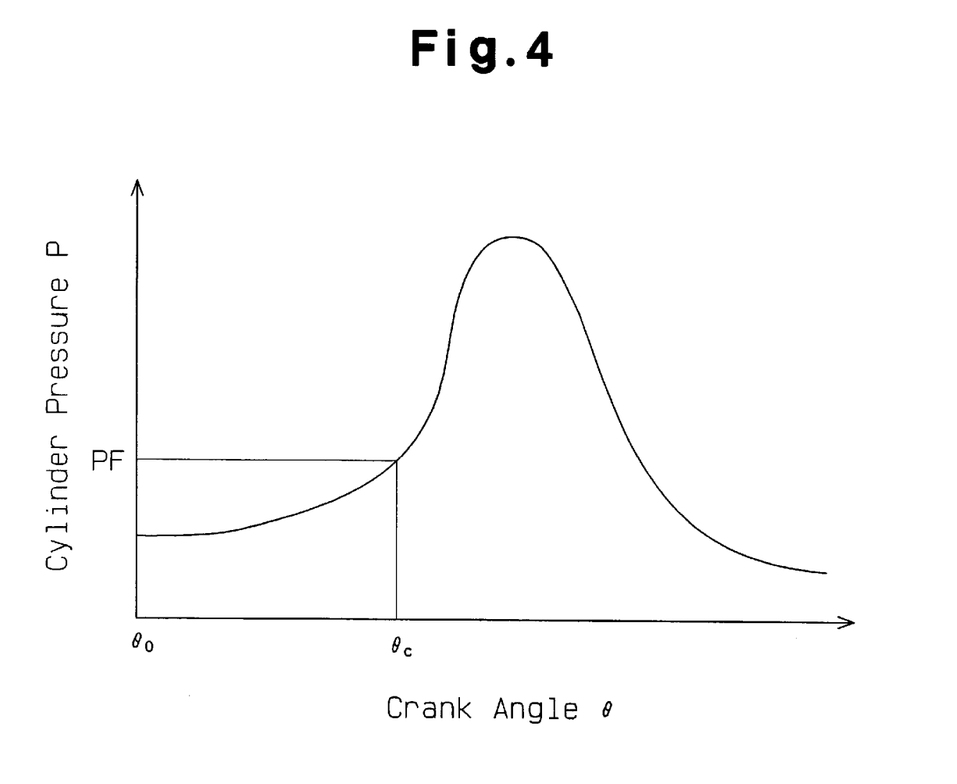
FIG. 4 is a graph showing the relationship between the crank angle and the maximum cylinder pressure.

FIG. 4 shows functional data that is stored in the ROM 33. The parameters of the functional data are the cylinder pressure P, which is produced in each combustion chamber 5 (cylinder 1a), and the crank angle θ. The cylinder pressure P varies in accordance with the engine speed NE and the intake air pressure (intake air amount). Therefore, in the functional data, the maximum cylinder pressure P is mapped in correspondence with the crank angle θ. The ECU 30 refers to the functional data to obtain the reference crank angle $\theta_c$ that corresponds to the fuel pressure PF.

At step 220, the ECU 30 judges whether or not the injection termination angle $\theta_e$ is equal to or greater than the reference crank angle $\theta_c$. If it is determined that the injection termination angle $\theta_e$ is equal to or greater than the reference crank angle $\theta_c$, the fuel injection pressure will, at some time during fuel injection, be lower than the cylinder pressure P. In this case, the ECU 30 proceeds to step 240.

At step 240, the ECU 30 subtracts the difference between the injection termination angle $\theta_e$ and the reference crank angle $\theta_c$, or angle $(\theta_e - \theta_c)$, from the present injection commencement angle $\theta_S$. The ECU 30 then renews the injection commencement angle $\theta_S$ with the computed value $\{\theta_S - (\theta_e - \theta_c)\}$. In this step, the ECU 30 does not alter the fuel injection time π. Therefore, the injection termination angle $\theta_e$ is decreased (advanced) by angle $(\theta_e - \theta_c)$ so that it is equal to the reference crank angle $\theta_c$. The ECU 30 advances the time period during which each injector 11 is opened by a time corresponding to angle $(\theta_e - \theta_c)$, but the duration of that time period τ remains the same.

The injection commencement angle $\theta_S$ and the fuel injection time τ, which are computed in this routine, are referred to by the ECU 30 in another routine to open and close each injector 11 and control the amount of injected fuel.

The ECU 30 proceeds to step 250 from either step 220, if it in determined that the injection termination angle $\theta_e$ is not equal to or greater than the reference crank angle $\theta_c$, or from step 240. At step 250, the ECU 30 reads the present crank angle θ.

At step 260, the ECU 30 judges whether or not the present crank angle θ has reached the reference crank angle $\theta_c$. If it is determined that the present crank angle θ has not reached the reference crank angle $\theta_c$, the ECU 30 returns to step 250. In step 260, if it is determined that the present crank angle θ has reached the reference crank angle $\theta_c$, the ECU 30 proceeds to step 270.

At step 270, the ECU 30 determines whether or not the injector 11 is opened. If it is determined that the injector 11 is not opened, that is, if it is determined that the injection of fuel has been terminated, the ECU 30 temporarily terminates subsequent processing.

In step 270, if it is determined that the injector 11 is opened, this indicates that a sudden increase of the engine speed NE has caused the injector 11 to remain opened even after the crank angle θ has reached the reference crank angle $θ_c$. Thus, the ECU 30 proceeds to step 280 and forcibly closes the injector 11. The ECU 30 temporarily terminates subsequent processing until the next execution of the routine.

The advantages of the present invention will now be described.

The fuel pressure PF in the distribution pipe 10 is low when the engine 1 is not running. Thus, when the engine 1 is started, the fuel injection pressure in each injector 11 tends to be low. In addition to the fuel injection pressure being low, the fuel injection amount QFIN is increased when starting the engine 1. Thus, the fuel injection time τ is relatively long and the injection termination angle $θ_e$ is increased (or the termination timing is retarded). During starting, the fuel injection pressure may be lower than the cylinder pressure P and thus the air in the combustion chamber 5 is apt to enter the injector 11.

However, in the preferred and illustrated embodiment, when the engine 1 is being started and the fuel injection pressure of the injector 11 (fuel pressure PF) is relatively low, the ECU 30 judges whether the injection termination angle $θ_e$ is equal to or greater than the reference crank angle $θ_c$. If it is determined that the injection termination angle $θ_e$ is equal to or greater than the reference crank angle $θ_c$, the ECU 30 decreases (advances) the injection commencement angle $θ_S$, which also decreases the injection termination angle $θ_e$. This prevents the fuel injection pressure from becoming lower than the cylinder pressure P when the injector 11 is opened.

Accordingly, in the preferred and illustrated embodiment, the high pressure air in each combustion chamber 5 does not enter the associated injector 11. This significantly increases the life of the injectors 11.

In the preferred and illustrated embodiment, the time period during which fuel is injected from the injector 11 is advanced by subtracting the same crank angle ($θ_e$-$θ_c$) from the injection commencement angle $θ_S$ and the injection termination angle $θ_e$. This prevents the fuel injection pressure from being lower than the cylinder pressure P. Since the fuel injection time τ is not altered, the amount of fuel injected from the injector 11 is not altered, and satisfactory starting of the engine 1 is guaranteed.

The engine speed NE may increase suddenly after commencing the injection of fuel from the injector 11 at the injection commencement angle $θ_S$ and before the fuel injection time τ lapses. In such case, the crank angle θ at which the injector 11 is closed to stop the injection of fuel is greater than the computed injection termination angle $θ_e$. This would cause the injector 11 to remain opened even when the crank angle θ reaches the reference crank angle $θ_c$. This may occur because the injection time τ is referred to in determining the termination timing rather than the actual crank angle θ.

However, in the preferred and illustrated embodiment, if the injector 11 is opened when the crank angle θ reaches the reference crank angle $θ_c$, the injector 11 is forcibly closed. This prevents the air fuel mixture in the cylinder from entering the injector 11.

In the preferred and illustrated embodiment, the reference crank angle $θ_c$, which is used to judge whether or not the fuel injection pressure is lower than the cylinder pressure P, is obtained in accordance with the fuel pressure PF, which is detected by the fuel pressure sensor 63. Thus, in comparison with the use of a fixed value as the reference crank angle $θ_c$, the recognition of the timing at which the fuel injection pressure becomes lower than the cylinder pressure P is more accurate. This enables the alteration of the injection commencement angle $θ_S$ (injection commencement timing) and the injection termination angle $θ_e$ (injection termination timing). This also determines when to forcibly close the injector 11.

It should be apparent to those skilled in the art that the present invention may be embodied in many other specific forms without departing from the spirit or scope of the invention. Particularly, it should be understood that the invention may be embodied in the following forms.

In the preferred and illustrated embodiment, the reference pressure value PF1 is set at a constant pressure value that is greater than the maximum pressure value in the combustion chamber 5 during the compression stroke. The maximum pressure value differs slightly in accordance with the engine speed NE and the intake air amount. Hence, the reference pressure value PF1 may be set in accordance with the engine speed NE and the intake air amount. This improves accuracy when determining whether or not the fuel pressure PF is sufficient for injecting fuel from the injector 11 during the compression stroke.

In the preferred and illustrated embodiment, the starting of the engine 1 is recognized from the starter signal STA and the engine speed NE. However, the starting of the engine 1 may be recognized from only the starter signal STA or only the engine speed NE.

In the preferred and illustrated embodiment, malfunctions that may occur during starting of the engine 1 if the fuel injection pressure becomes lower than the cylinder pressure P are prevented. However, such malfunctions may be prevented not just when the engine 1 is being started but also throughout the operation of the engine 1 by eliminating steps 100–160.

Therefore, the present examples and embodiments are to be considered as illustrative and not restrictive and the invention is not to be limited to the details given herein, but may be modified within the scope and equivalence of the appended claims.

What is claimed is:

1. A controller for controlling a fuel injection valve that communicates with a combustion chamber in an internal combustion engine, wherein the fuel injection valve contains pressurized fuel that is injected into the combustion chamber, the controller comprising:

a pressure detector for detecting a fuel pressure within a distribution pipe that is in fluid communication with the injection valve, wherein the controller computes a reference time at which a pressure in the combustion chamber will be greater than the pressure of the fuel in the injection valve based on the detected fuel pressure and controls the fuel injection valve to complete fuel injection before the reference time.

2. The controller according to claim 1, wherein the controller closes the injection valve before the reference time.

3. The controller according to claim 1, wherein the controller computes an initial injector opening time at which the injection valve is opened and an initial injector closing time at which the injection valve is closed, and if the initial closing time is later than the reference time, the injection valve advances the opening time and the closing time from their initial values to complete fuel injection before the reference time.

4. The controller according to claim 3, wherein, if the opening and closing times are advanced, the controller advances the opening time and the closing time by a time that is the difference between the reference time and the initial closing time.

5. The controller according to claim 1 further comprising a cranking detector for detecting whether the engine is being cranked, wherein the controller completes fuel injection from the injection valve before the reference time when the engine is being cranked.

6. The controller according to claim 5, wherein the cranking detector includes at least one of a starter actuation detector for detecting whether an engine starter is being actuated and a speed detector for detecting the engine speed.

7. The controller according to claim 3 further comprising an angle detector for detecting a rotational angle of an output shaft of the engine, wherein the opening time, the closing time and the reference time are determined by the rotational angle of the output shaft.

8. The controller according to claim 7 including a pump driven by the output shaft to feed the fuel to the injection valve.

9. The controller according to claim 7, wherein the controller has a memory that contains functional data indicating relationship between the pressure in the combustion chamber and the rotational angle of the output shaft, and wherein the controller computes the reference time based on the detected fuel pressure and the functional data in the memory.

10. The controller according to claim 1, wherein the engine performs combustion in a stratified charge mode, in which the air-fuel ratio varies within the combustion chamber, and a homogeneous charge mode, in which the air-fuel mixture is substantially homogeneous within the combustion chamber, wherein the controller controls the injection valve to directly inject fuel into the combustion chamber during a compression stroke of the engine for performing stratified charge combustion, and wherein the controller controls the injection valve to directly inject fuel into the combustion chamber during an intake stroke of the engine for performing homogeneous charge combustion.

11. The controller according to claim 1, further comprising a detector that detects whether the injection valve is open at the reference time; and
    a forcible closing device connected to the controller that forcibly closes the injection valve when it is determined that the injection valve is opened at the reference time.

12. A method for controlling a fuel injection valve that communicates with a combustion chamber in an internal combustion engine, wherein the fuel injection valve contains pressurized fuel that is injected into the combustion chamber, the method comprising the steps of:
    detecting a fuel pressure within a distribution pipe that is in fluid communication with the injection valve;
    computing a reference time at which the pressure in the combustion chamber will be greater than the pressure of the fuel in the injection valve based on the detected fuel pressure; and
    controlling the fuel injection valve to complete fuel injection before the reference time.

13. The method according to claim 12 further comprising the steps of:
    computing an initial injector opening time at which the injection valve is opened and an initial injector closing time at which the injection valve is closed; and
    if the initial closing time is later than the reference time, advancing the opening time and the closing time from their initial values to complete fuel injection before the reference time.

14. The method according to claim 13, wherein the advancing step includes advancing the opening time and the closing time by a time that is the difference between the reference time and the initial closing time.

15. The method according to claim 12 further comprising a step of detecting whether the engine is being cranked, wherein the controlling step includes a step of completing fuel injection from the injection valve before the reference time when the engine is being cranked.

16. The method according to claim 13 further comprising a step of detecting a rotational angle of an output shaft of the engine, wherein the opening time, the closing time and the reference time are determined by the rotational angle of the output shaft.

17. The method according to claim 16 further comprising a step of computing the reference time based on the detected injection pressure and functional data indicating relationship between the pressure in the combustion chamber and the rotational angle of the output shaft.

18. The method according to claim 12 further comprising the steps of:
    controlling the injection valve to directly inject fuel into the combustion chamber during a compression stroke of the engine for performing stratified charge combustion; and
    controlling the injection valve to directly inject fuel into the combustion chamber during an intake stroke of the engine for performing homogeneous charge combustion.

19. The method according to claim 12 further comprising the steps of:
    detecting a rotational angle of an output shaft of the engine, wherein the reference time is determined by the rotational angle of the output shaft;
    determining a reference crank angle of the output shaft that corresponds to the reference time;
    determining whether the injection valve is open when the output shaft has been rotated to the reference crank angle; and
    forcibly closing the injection valve immediately if the injection valve is determined to be open in the previous step.

20. A method for controlling fuel injection, in an internal combustion engine that includes a fuel injection valve that injects fuel directly into a combustion chamber, during starting of the engine, the method comprising:
    pre-determining a reference pressure value that is greater than a maximum pressure value in the combustion chamber during a compression stroke of the engine;
    detecting a fuel pressure within a distribution pipe that is in fluid connection with the injection valve;
    determining whether the detected fuel pressure is greater than or equal to the reference pressure value; and
    injecting fuel into the combustion chamber during the compression stroke only when the detected fuel pressure is greater than or equal to the reference pressure value.

* * * * *